(12) United States Patent
Kech

(10) Patent No.: US 9,653,802 B2
(45) Date of Patent: May 16, 2017

(54) RADAR-BASED FILL LEVEL MEASUREMENT DEVICE HAVING A SECURITY DEVICE

(71) Applicant: VEGA Grieshaber KG, Wolfach (DE)

(72) Inventor: Guenter Kech, Wolfach (DE)

(73) Assignee: Vega Grieshaber KG, Wolfach (DE)

( * ) Notice: Subject to any disclaimer, the term of this patent is extended or adjusted under 35 U.S.C. 154(b) by 350 days.

(21) Appl. No.: 14/327,139

(22) Filed: Jul. 9, 2014

(65) Prior Publication Data
US 2015/0029054 A1    Jan. 29, 2015

(30) Foreign Application Priority Data

Jul. 22, 2013   (DE) .................. 10 2013 214 324

(51) Int. Cl.
| | | |
|---|---|---|
| *G01F 23/284* | (2006.01) | |
| *G01S 13/88* | (2006.01) | |
| *H01Q 3/20* | (2006.01) | |
| *G01F 25/00* | (2006.01) | |
| *H01Q 3/16* | (2006.01) | |

(52) U.S. Cl.
CPC ............. *H01Q 3/20* (2013.01); *G01F 23/284* (2013.01); *G01F 25/0061* (2013.01); *G01S 13/88* (2013.01); *H01Q 3/16* (2013.01)

(58) Field of Classification Search
CPC .... G01F 23/284; G01F 25/0061; G01S 13/88; H01Q 3/20; H01Q 3/16
USPC ........................................................ 342/124
See application file for complete search history.

(56) References Cited

U.S. PATENT DOCUMENTS

| | | | | |
|---|---|---|---|---|
| 4,219,814 A | * | 8/1980 | Johnson | .................. C21B 7/24 266/86 |
| 7,088,285 B2 | * | 8/2006 | Smith | ................. G01F 25/0061 342/124 |
| 7,417,919 B2 | * | 8/2008 | Jones | ....................... G01H 5/00 367/13 |

(Continued)

FOREIGN PATENT DOCUMENTS

| | | |
|---|---|---|
| EP | 1 751 506 A1 | 2/2007 |
| EP | 2 199 763 A1 | 12/2008 |
| GB | 2 443 533 A | 10/2007 |

OTHER PUBLICATIONS

EPO Search report dated Apr. 1, 2015 cited in corresponding EP application No. 14173776.7, Apr. 1, 2015.
GPO Search Report dated Apr. 15, 2014.

*Primary Examiner* — Peter Bythrow
(74) *Attorney, Agent, or Firm* — Juneau & Mitchell

(57) ABSTRACT

A radar-based fill level measurement device having a signal generator for the purpose of generating electromagnetic waves, and an antenna for the purpose of emitting the electromagnetic waves into a container, as well as for the purpose of receiving electromagnetic waves reflected out of the container, having a security device for the purpose of verifying the functional capability or improving the measurement quality of the radar-based fill level measurement device, wherein the security device has a reflector and an adjusting device, and is suitably designed to move the reflector between at least a first position, in which it reflects the electromagnetic waves, and a second position, in which it reflects the electromagnetic waves to a reduced degree, and wherein the security device has a drive which acts on the adjusting device.

11 Claims, 2 Drawing Sheets

(56) References Cited

U.S. PATENT DOCUMENTS

| | | | | |
|---|---|---|---|---|
| 8,009,085 B2* | 8/2011 | Kuhlow | ............... | G01F 23/284 |
| | | | | 324/600 |
| 9,419,343 B2* | 8/2016 | Dieterle | ............... | H01Q 15/02 |
| 2004/0145510 A1* | 7/2004 | Edvardsson | .......... | G01F 23/284 |
| | | | | 342/5 |
| 2005/0264440 A1* | 12/2005 | Smith | ................. | G01F 25/0061 |
| | | | | 342/124 |
| 2007/0236385 A1* | 10/2007 | Kleman | ............... | G01F 23/284 |
| | | | | 342/124 |
| 2008/0098817 A1* | 5/2008 | Jones | ...................... | G01H 5/00 |
| | | | | 73/597 |
| 2010/0156702 A1* | 6/2010 | Edvardsson | .......... | G01F 23/284 |
| | | | | 342/124 |
| 2010/0207807 A1* | 8/2010 | Kuhlow | ............. | G01F 25/0061 |
| | | | | 342/124 |
| 2014/0028492 A1* | 1/2014 | Mayer | ................... | G01F 23/284 |
| | | | | 342/124 |
| 2014/0091962 A1* | 4/2014 | Lenk | .................... | G01F 23/284 |
| | | | | 342/5 |

\* cited by examiner

RADAR-BASED FILL LEVEL MEASUREMENT DEVICE HAVING A SECURITY DEVICE

CROSS REFERENCE TO RELATED APPLICATIONS

This patent application claims priority German Patent Application 10 2013 214 324.9, filed on Jul. 22, 2013.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The present invention relates to a radar-based fill level measurement device having a security device.

Background of the Invention

The current state of knowledge is as follows.

Radar-based fill level measurement devices having such a security device are known in the prior art, for example from U.S. Pat. No. 8,009,085 B2, and have a signal generator for the purpose of producing electromagnetic waves, and an antenna for the purpose of emitting the electromagnetic waves into a container, as well as for the purpose of receiving reflected electromagnetic waves out of the container, wherein the security device is suitably designed to verify the proper functioning of the radar-based fill level measurement device. The security devices demonstrated in the prior art have a reflector and an adjusting device for this purpose, said adjusting device being suitably designed to adjust the reflector at least between a first position in which it reflects the electromagnetic waves, and a second position in which it reflects the electromagnetic waves to a reduced degree.

The radar-based fill level measurement devices known in the prior art are generally used in containers which are generally constructed as tanks or silos for the purpose of storing various different materials. Foods, drinks, drugs, or fuels, by way of example, are stored in such tanks, such that a measurement of the fill level thereof must be carried out without contact. In the prior art, such contactless fill level measurement techniques are, by way of example, the radar-based fill level measurement device mentioned above, or an alternative ultrasound-based fill level measurement device. Radar-based fill level measurement devices are widely used due to their measurement precision and minimal susceptibility to failure.

The radar-based fill level measurement devices known in the prior art are generally installed in the upper region of a tank or silo via a flange, wherein the electronics are arranged outside, and the antenna of the radar-based fill level measurement device is arranged inside, of the housing. The antenna is suitably designed for the purpose of transmitting electromagnetic waves—meaning particularly a radar signal—in the direction of the fill material which is stored inside the container, and of receiving electromagnetic waves reflected by the material. The fill level inside the container can be determined based on the time difference between a transmission of the electromagnetic signal and the reception of the reflected electromagnetic signal.

For the purpose of verifying the proper functioning of the radar-based fill level measurement device, particularly to verify the proper functioning when the fill level is maximum, the same being relevant to safety, it is necessary to include a security device which makes it possible to determine the proper functioning when the fill level is at maximum. In the prior art, for this purpose, the practice of manually placing a reflector in the beam path of the radar-based fill level measurement device, during a security test, is known, to verify the functioning of the measurement device at the desired maximum fill level, even when the container fill level is lower—by bringing the reflector, when the fill level is lower, into the beam path of the radar-based fill level measurement device, and thereby generating a reflection corresponding to the maximum fill level.

In the devices known from the prior art, for this purpose it is necessary for an operator to manually place the reflector in the beam path of the radar-based fill level measurement device, wherein the operator must climb onto the container being monitored in order to operate the reflector. Because monitored containers are typically silos or tanks with heights up to 35 m, this presents a significant risk. In addition, it is considered disadvantageous that, for a security verification, every single container must be visited and the reflector manually operated.

The problem addressed by the present invention is that of removing the disadvantages known from the prior art, and of providing an advanced radar-based fill level measurement device which does not have these disadvantages.

This problem is addressed by a radar-based fill level measurement device having the features disclosed herein.

BRIEF SUMMARY OF THE INVENTION

In a preferred embodiment, a radar-based fill level measurement device comprising a signal generator for the purpose of generating electromagnetic waves, and an antenna for the purpose of emitting the electromagnetic waves into a container, as well as for the purpose of receiving electromagnetic waves reflected out of the container, further comprising a security device for the purpose of verifying the functional capability or improving the measurement quality of the radar-based fill level measurement device, wherein the security device comprises a reflector and an adjusting device, and is suitably designed to move the reflector at least between a first position, in which it reflects the electromagnetic waves, and a second position, in which it reflects the electromagnetic waves to a reduced degree, wherein the security device has a drive which acts on the adjusting device.

In another preferred embodiment, the radar-based fill level measurement device described herein, wherein the drive is connected to the electronics of the radar-based fill level measurement device, and the reflector moves from the second position into the first position upon request by the electronics.

In another preferred embodiment, the radar-based fill level measurement device described herein, wherein the drive is connected to an operating unit and the reflector moves from the second position into the first position upon request by the operating unit.

In another preferred embodiment, the radar-based fill level measurement device described herein, wherein the security device is designed to be spring-loaded in the first position.

In another preferred embodiment, the radar-based fill level measurement device described herein, wherein the drive is driven electrically, electromagnetically, or pneumatically.

In another preferred embodiment, the radar-based fill level measurement device described herein, wherein, in the second position, a reduction device is arranged in such a manner that the reflector is at least partially covered as seen in the direction of the beam path.

In another preferred embodiment, the radar-based fill level measurement device described herein, wherein the reduction device is designed as a diffusor.

In another preferred embodiment, the radar-based fill level measurement device described herein, wherein the reduction device is constructed of a material which absorbs the electromagnetic waves.

In another preferred embodiment, the radar-based fill level measurement device described herein, wherein the reflector in the second position is accommodated in the reduction device.

The radar-based fill level measurement device of claim 1, wherein the drive is suitably designed to move the reflector rotationally.

In another preferred embodiment, the radar-based fill level measurement device described herein, wherein the drive is suitably designed to move the reflector linearly.

In another preferred embodiment, the radar-based fill level measurement device described herein, wherein the reflector is arranged in the first position substantially perpendicular to the beam path, and in the second position substantially parallel to the beam path.

In another preferred embodiment, the radar-based fill level measurement device described herein, wherein the drive is suitably controlled to move the reflector continuously, and preferably permanently.

DETAILED DESCRIPTION OF THE INVENTION

Figure 1:
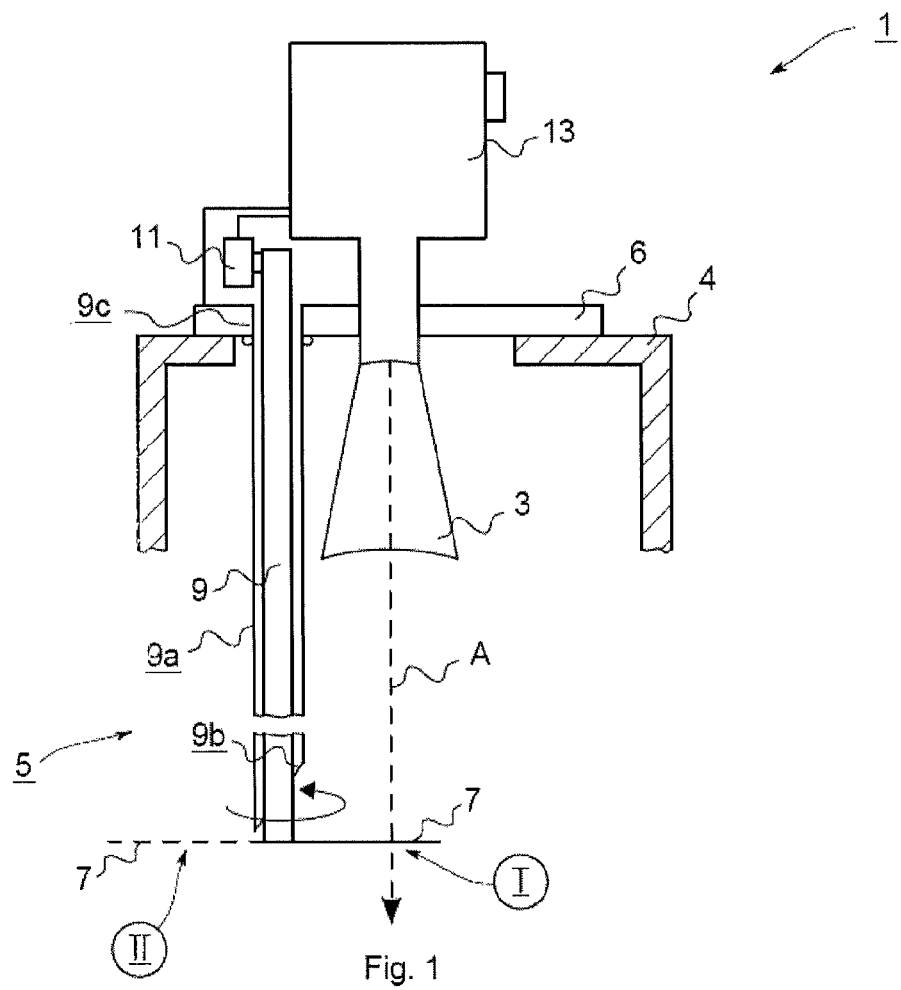
FIG. 1 is a line drawing evidencing a radar-based fill level measurement device according to the invention.

The present invention relates to a radar-based fill level measurement device according to the invention, having a signal generator for the purpose of generating electromagnetic waves, and an antenna for the purpose of emitting the electromagnetic waves into a container, as well as for the purpose of receiving reflected electromagnetic waves from the container, has a security device for the purpose of verifying the proper functioning of the radar-based fill level measurement device, wherein the security device has a reflector and an adjusting device which is suitably designed for adjusting the reflector at least between a first position in which it reflects the electromagnetic waves, and a second position in which it reflects the electromagnetic waves to a reduced degree, wherein the security device has a drive which acts on the adjusting device.

According to the present invention, a drive is therefore included which acts on the adjusting device of the reflector arranged in the container, such that an automated and remote-controllable arrangement is created which renders unnecessary the approach of visiting every single container, and particularly manually operating the security device. Increased operating comfort is established in this manner, and the work safety of corresponding security tests is decisively improved.

The drive can be connected, by way of example, to electronics of the radar-based fill level measurement device, and the reflector can move upon request of the electronics from the second position into the first position, such that it is possible to create an entirely automated process for verifying the proper functioning of the radar-based fill level measurement device, particularly at the position of the maximum fill level. In this manner, a regular verification of the proper functioning at the fill level which is relevant for safety can be carried out, such that increased operational security of the radar-based fill level measurement device is also achieved. In this way, it is also possible to improve the quality of the measurements which are carried out. By way of example, it is possible for the measurement device to automatically determine a degree of contamination of the measurement device by means of comparing the signal reflected by the reflector with earlier measurement values, in order to initiate maintenance of the system or to recommend different maintenance intervals. The parameters in this case can be, by way of example, chronological values, signal amplitudes, signal widths, or proportional values, such as a signal to noise ratio, for example.

In one alternative embodiment, the drive can be connected to an operating unit, and the reflector can move from the second position into the first position upon a request by the operating unit.

This embodiment constitutes a compromise solution wherein increased work security is created and it is possible to initiate a verification of the proper functioning of the radar-based fill level measurement device, by way of example, by remote control from a measuring station.

In one embodiment of the security device, the same has a spring-loaded design in a first position, such that the reflector, driven by the drive, is brought into the first position, and then is brought back into the second position by the spring loading once the drive force is removed. In this manner, it is ensured that a normal fill level measurement is possible when the drive fails, for example.

The drive of the security device can have an electric, electromagnetic, or pneumatic design, by way of example. This listing of different drive options is merely exemplary, and does not exclude other drive options which can be considered. Electric, electromagnetic, and pneumatic drives, however, have been very well tested, and can therefore be used with low probability of failure, and therefore high reliability.

In one preferred embodiment, a reduction device is arranged in the second position in such a manner that the reflector is at least partially covered as seen in the direction of the beam path. By means of such a reduction device, which can be designed as a diffusor, by way of example, or additionally or alternatively can be made of a material which absorbs electromagnetic waves, a reliable differentiation is enabled between the reflection in the first position and the second position. In addition, the reduction device is also preferably designed in such a manner that, in the second position, there is no reflection which correlates with a fill level. This can either be achieved in that the reduction device only generates a very diffuse echo as a result of a suitable surface construction, said echo scattering the transmitted electromagnetic rays, or in that, alternatively or in addition thereto, the reduction device produces such a high damping of the reflection, as a result of the selection of the material, that the reflection likewise cannot be detected as correlating with a fill level.

In one preferred embodiment, the reflector is accommodated in the reduction device in a second position, meaning that it is particularly entirely surrounded by the reduction device.

By means of a complete enclosure of the reflector by the reduction device, it can particularly be ensured that the reflector is protected in the second position from external influences, and particularly from deposits caused by contamination. In this manner, it is possible to achieve increased reliability of the security device, and extended operating life.

The drive of the security device can be suitably designed, by way of example, to move the reflector by rotation. When the reflector undergoes a rotary movement, a continuous movement can occur, by way of example, wherein the reflector is rotated in a plane perpendicular to the beam path, such that a continuous transition thereby occurs between the first and the second position.

The electromagnetic drive can be designed as a step motor for this purpose, by way of example.

In a further embodiment, the drive can also be suitably designed for the purpose of moving the reflector linearly, wherein the reflector is therefore transitioned from the second position into the first position by a sliding movement, by way of example.

In a further embodiment, the reflector can be arranged substantially perpendicular to the beam path when in the first position, and substantially parallel to the beam path when in the second position. Such an embodiment can be achieved, by way of example, in that the reflector executes a hinge movement—meaning a rotation about an axis perpendicular to the beam path, or is arranged on the adjusting device by means of an extension with a 45° miter joint, and rotates about the same.

In both cases—a hinge movement and a rotation about a 45° miter joint—the reflector can be withdrawn into the adjusting device, in the parallel orientation of the reflector to the beam path, such that it is completely removed from the beam path of the antenna.

In one implementation of the invention, the reflector is continuously moved into and back out of the beam path of the antenna. Such a continuous movement can either take place upon request, or permanently, and can be implemented both in configurations with a rotary movement and a linear movement of the reflector. In the case of such a continuous movement, for example in the case of a rotation in a plane perpendicular to the beam path of the antenna, the reflector is pivoted into the beam path and then pivoted back out. The amplitude of the signal reflected by the reflector to the antenna in this case is continuously larger, until it reaches a maximum, and then drops continuously.

In this manner, a change in the amplitude relative to the position of the reflector can be analyzed, by way of example, and a momentary malfunction or a failure of the measurement device which can be expected at a later point in time can be determined by a comparison with earlier measurements. It can also be contemplated that operating parameters of the measurement device are modified based on the measured amplitude values, in order to prevent malfunctions at a later point in time.

A corresponding approach is also possible with a linear movement of the reflector in a plane which is perpendicular to the beam path of the antenna.

When the reflector executes a pivot movement about an axis which is perpendicular to the beam path of the antenna, the reflector is transitioned from a position proceeding from an arrangement which is substantially parallel to the beam path of the antenna, into a position which is perpendicular to the beam path, and in the process, a reflector surface continuously passes through all angles from 180° to 90° with respect to the beam path.

In this manner, it can likewise be verified whether a momentary malfunction has occurred, or can be expected in the future. Here as well, it is possible to modify operating parameters of the measurement device based on the measured amplitude values, in order to prevent malfunctions at a later point in time.

DETAILED DESCRIPTION OF THE FIGURES

FIG. 1 shows a first embodiment of a radar-based fill level measurement device 1 having a security device 5 for the purpose of verifying the proper functioning of the radar-based fill level measurement device 1 at a specified fill level. The radar-based fill level measurement device 1 is connected to a container 4 via a flange 6, wherein the electronics 13 of the radar-based fill level measurement device 1 are arranged outside, and an antenna 3 of the radar-based fill level measurement device 1 is arranged inside, the container 4. The electronics 13 have a signal generator for the purpose of generating electromagnetic waves in the radar range, which are emitted via the antenna 3 in the direction of a fill material arranged in the container 4. The electromagnetic waves reflected by the fill material are returned to the antenna 3 and received by the same, wherein a determination of the fill level in the container 4 can be made via a determination of the travel time.

A security device 5, having a reflector 7 which is able to pivot into the beam path of the antenna 3 is also arranged on the flange 6, wherein said reflector [7] can be actuated via an adjusting device 9 with a passage 9c for the purpose of fixing the same on the flange 6. The adjusting device 9 is connected to a drive 11 which is designed in the present embodiment as an electric motor. The adjusting device 9 consists of a guide tube 9a which is fixed to the flange 6. The guide tube 9a can have a miter edge 9b on the outlet opening, for the adjusting device 9, for the purpose of minimizing undesired reflections of the radar beam. The drive 11 acts on the adjusting device in such a manner that the latter causes the reflector 7 to rotate about a longitudinal axis of the adjusting device 9, such that the reflector 7 is able to move between a first position I, in which it is arranged in the beam path of the antenna 3 and reflects the electromagnetic waves, and a second position II, in which it is pivoted out of the beam path of the antenna 3 and therefore does not reflect the electromagnetic waves, or only to a reduced degree. The reflector 7 is arranged, at least in the first position I, in a plane which is perpendicular to a beam path A of the antenna 3, such that electromagnetic waves are directly reflected to the antenna 3. The reflector 7 can be arranged, by way of example, at a fill level which must be verified, particularly a maximum fill level, such that a regular verification of the functional capability of the radar-based fill level measurement device 1 can be carried out at this critical fill level.

In the present embodiment, the drive 11 is connected to the electronics 13 of the radar-based fill level measurement device 1, and pivots the reflector 7 out of the second position II and into the first position I upon request by the electronics 13, such that a functions check can be carried out in an automated manner.

Such a functions check can also be initiated, in the present embodiment, manually, for example from a remote control station, or can preferably take place in regular intervals in an automated manner.

Figure 2:
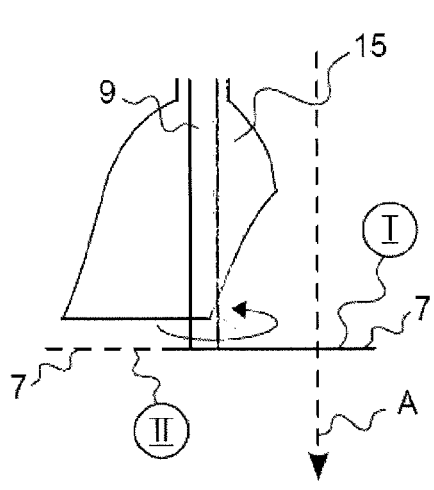
FIG. 2 is a line drawing evidencing a detailed enlargement of a security device having a reduction device.

FIG. 2 shows a detail enlargement of a second embodiment of a security device 5, such as can be used in FIG. 1.

In the embodiment illustrated in FIG. 2, the reflector 7 and the adjusting device 9 are designed—as in the embodiment in FIG. 1—in such a manner that a rotation of the reflector 7 is realized about an axis parallel to the beam path A of the antenna 3. In addition to the design in FIG. 1, in the embodiment in FIG. 2, a reduction device 15 is included, which is designed as a diffusor. The reduction device 15 is thereby designed with a surface which diffusely reflects electromagnetic waves emitted by the antenna 3 in the direction of the reduction device 15, such that the reflector 7 is positioned in the second position II in a region which is shielded by the reduction device 15, such that an additional reduction of the reflections caused by the reflector 7 results. The reduction device 15 can, in addition or as an alternative to a diffusely reflecting surface, also be constructed of a material which absorbs the electromagnetic waves, such that a further reduction of the amplitude of the diffusely reflected electromagnetic waves results.

Figure 3:
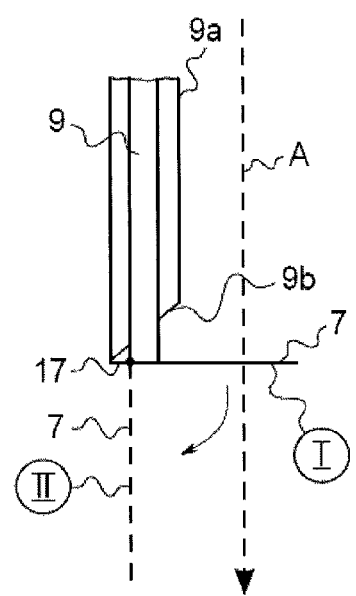
FIG. 3 is a line drawing evidencing a second detail enlargement of a security device.

A further embodiment of a security device 5 is illustrated in FIG. 3, wherein the reflector 7 in this embodiment is designed to be able to pivot and/or hinge about an axis 17 which runs perpendicular to the beam path A of the antenna 3. A pivoting and/or hinging in the context of the present application means that the reflector 7 is arranged in the first position I substantially perpendicular to the beam path A, and in the second position II substantially parallel to the same. A transitioning of the reflector 7 from the first position I into the second position II is realized by a pivoting about an angle of approx. 90°, such that the reflector 7 is arranged in the second position II as an extension of the adjusting device 9. As a result of the fact that the reflector 7 is arranged in the second position II substantially parallel to the beam path A of the antenna 3, electromagnetic waves are not reflected back by the reflector 7 in the second position II in the direction of the antenna 3, but rather are deflected in the direction of the fill material, and produce a reflection which is detected by the antenna 3 at a point in time which does not correlate with a fill level.

In one implementation of the embodiment illustrated in FIG. 3, the reflector 7 can, in addition to the pivot movement, also be drawn back into the adjusting device 9, such that it is completely surrounded by the same and therefore does not generate any reflection of electromagnetic waves.

Figure 4:
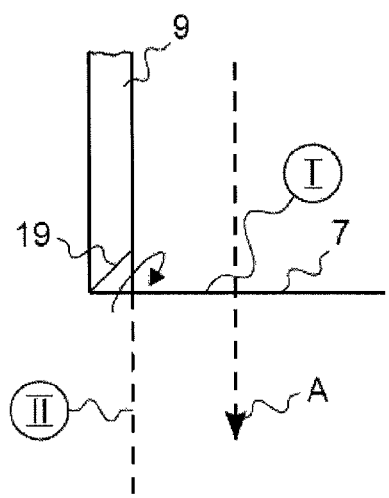
FIG. 4 is a line drawing evidencing a third detail enlargement of a security device.

A further embodiment of a security device 5 is illustrated in FIG. 4, wherein the reflector 7 is oriented in the first position I substantially perpendicular to the beam path A of the antenna 3, and in the second position II substantially parallel to this beam path A. A transitioning from the first position I into the second position II is realized in the present embodiment by a rotation of the reflector 7 which is attached to the adjusting device 9 with a 45° miter joint 19. As in the embodiment according to FIG. 3, the reflector 7 can therefore either be arranged in the first position I in a plane which is substantially perpendicular to the beam path A of the antenna 3, or in the second position II parallel to the same.

Figure 5:
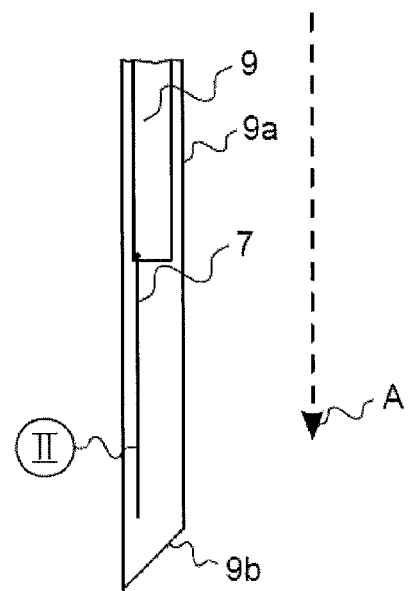
FIG. 5 is a line drawing evidencing one implementation of the embodiment in FIG. 3.

FIG. 5 shows one implementation of the embodiment in FIG. 3, wherein in FIG. 5 the reflector 7 is illustrated in the second position II. In the illustrated embodiment, the reflector 7 is oriented substantially parallel to the beam path A of the antenna 3, and is drawn into the guide tube 9a of the adjusting device 9. In this manner, any reflections on the reflector 7 are prevented, and at the same time, a contamination of the reflector 7 is prevented as well.

It is hereby noted at this point that a linear movement of the reflector 7 is likewise possible between the first position I and the second position II.

In all manner of rotary movements, either a continuous movement of the reflector 7 can occur, such that it is possible for a verification of the functional capability of the radar-based fill level measurement device 1 to be carried out periodically every time the first position I is reached, or a movement can be initiated upon regular or non-regular requests by the electronics 13, which can also be initiated manually by a request signal, for example from a measurement station.

LIST OF REFERENCE NUMBERS 1 radar-based fill level measurement device
3 antenna
4 container
5 security device
6 flange
7 reflector
9 adjusting device
9a protective tube
9b miter edge
9c passage bearing
11 drive
13 electronics
15 reduction device
17 axis
19 miter edge
A beam path
I first position
II second position The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

I claim:

1. A radar-based fill level measurement device comprising a signal generator for the purpose of generating electromagnetic waves, and an antenna for the purpose of emitting the electromagnetic waves into a container, as well as for the purpose of receiving electromagnetic waves reflected out of the container, further comprising a security device for the purpose of verifying the functional capability or improving the measurement quality of the radar-based fill level measurement device, wherein the security device comprises a reflector and an adjusting device, and moves the reflector at least between a first position, in which it reflects the electromagnetic waves, and a second position, in which it reflects the electromagnetic waves to a reduced degree, wherein the security device has a drive which acts on the adjusting device, and wherein in the second position, a reduction device is arranged such that the reflector in the second position is accommodated in the reduction device.

2. The radar-based fill level measurement device of claim 1, wherein the drive is connected to the electronics of the radar-based fill level measurement device, and the reflector moves from the second position into the first position upon request by the electronics.

3. The radar-based fill level measurement device of claim 1, wherein the drive is connected to an operating unit and the reflector moves from the second position into the first position upon request by the operating unit.

4. The radar-based fill level measurement device of claim 1, wherein the security device is spring-loaded in the first position.

5. The radar-based fill level measurement device of claim 1, wherein the drive is driven electrically, electromagnetically, or pneumatically.

6. The radar-based fill level measurement device of claim 1, wherein the reduction device functions as a diffusor.

7. The radar-based fill level measurement device of claim 1, wherein the reduction device is constructed of a material which absorbs the electromagnetic waves.

8. The radar-based fill level measurement device of claim 1, wherein the drive moves the reflector rotationally.

9. The radar-based fill level measurement device of claim 1, wherein the drive moves the reflector linearly.

10. The radar-based fill level measurement device of claim 1, wherein the reflector is arranged in the first position substantially perpendicular to a beam path of the antenna, and in the second position substantially parallel to such beam path.

11. The radar-based fill level measurement device of claim 1, wherein the drive is controlled to move the reflector permanently.

* * * * *